(12) United States Patent
Singh et al.

(10) Patent No.: US 8,354,000 B2
(45) Date of Patent: Jan. 15, 2013

(54) APPARATUS FOR LASER CUTTING AND WELDING

(75) Inventors: Vijay Singh, Bernardsville, NJ (US); Michael Sanders, Hopatcong, NJ (US)

(73) Assignee: GE Healthcare Bio-Sciences Corp., Piscataway, NJ (US)

( * ) Notice: Subject to any disclaimer, the term of this patent is extended or adjusted under 35 U.S.C. 154(b) by 357 days.

(21) Appl. No.: 12/663,726

(22) PCT Filed: Jun. 18, 2008

(86) PCT No.: PCT/US2008/067306
§ 371 (c)(1),
(2), (4) Date: Dec. 9, 2009

(87) PCT Pub. No.: WO2009/002777
PCT Pub. Date: Dec. 31, 2008

(65) Prior Publication Data
US 2010/0171240 A1    Jul. 8, 2010

Related U.S. Application Data

(60) Provisional application No. 60/946,233, filed on Jun. 26, 2007.

(51) Int. Cl.
*B29C 65/78* (2006.01)
*B29C 65/16* (2006.01)

(52) U.S. Cl. .................................. 156/272.8; 156/379.6

(58) Field of Classification Search ............... 156/272.8, 156/272.2, 251
See application file for complete search history.

(56) References Cited

U.S. PATENT DOCUMENTS

| | | | |
|---|---|---|---|
| 2002/0027308 A1* | 3/2002 | Koppenhofer | 264/163 |
| 2002/0088094 A1* | 7/2002 | Barclay et al. | 24/30.5 R |
| 2005/0006360 A1* | 1/2005 | Barclay et al. | 219/121.72 |
| 2005/0224470 A1* | 10/2005 | Burt et al. | 219/121.63 |
| 2006/0094622 A1* | 5/2006 | Fisher et al. | 510/295 |

* cited by examiner

*Primary Examiner* — Daniel McNally (57) ABSTRACT

A method of forming plastic containers is disclosed. The method includes: providing a support platen having a cut outline and a groove outline in the top surface of the support platen and a plurality of exhaust ports in the bottom of the groove, where a plurality of spaced perforations are in the top surface of the support platen, where the groove is configured to define a cut outline; positioning a first film on the top surface of the support platen; providing a laser to cut the first film along the cut outline of the top surface of the support platen; providing a second film on top of the first film; connecting the plurality of exhaust ports and the plurality of space perforations to a vacuum source to secure the first film to the support platen; directing a jet of gas onto the second film at the to maintain the second sheet in contact with the first sheet at a seam during welding concentric with a beam from the laser to weld the first film and the second film; moving the laser and the support platen relative to each other to weld the first film and the second film along a seam outline; and providing the laser to cut the first film and the second film along the cut outline to provide a trimmed bag.

35 Claims, 9 Drawing Sheets

FIG. 8

APPARATUS FOR LASER CUTTING AND WELDING

CROSS-REFERENCE TO RELATED APPLICATIONS

This application is a filing under 35 U.S.C. §371 and claims priority to international patent application number PCT/US2008/067306 filed Jun. 18, 2008, published on Dec. 31, 2008, as WO 2009/002777, which claims priority to U.S. provisional patent application No. 60/946,233 filed Jun. 26, 2007; the entire disclosure of which is incorporated herein by reference in its entirety.

FIELD OF THE INVENTION

This invention relates to an apparatus for laser cutting and welding materials to form bags and other assemblies.

BACKGROUND OF THE INVENTION

Plastic bags are typically made from cut plastic sheets. In many cases lasers are utilized to cut plastic sheets and weld them together. Specifically, $CO_2$ lasers are almost universally utilized to weld and cut plastic materials. The rapid absorption of the laser energy produced in this configuration (10.6 µm) makes this an efficient system for this application. It is known that by varying the focus and dwell time of the laser, it is possible to cut, mark or weld thermoplastic materials.

However, there are problems associated with using the aforementioned laser to cut and weld plastic materials to form bags and assemblies. First, some prior art devices require that the film sheets must be oriented in the vertical plane. This makes it very difficult to support large sheets, and it is doubtful that the distance between the sheets and the laser can be practically maintained to the tight tolerances required in order not to burn or damage portions of the seam to be welded. The vertical orientation makes it impossible to support ports or other fixtures that may need to be attached to the sheets.

The aforementioned system requires dual laser sources—one on either side of the two sheets. In other systems, a complex beam splitter assembly is needed to weld and cut thermoplastic materials. It also requires the use of two air jets—one on each side of the two sheets—to force the sheets into an intimate contact needed for effective welding. Such a two-air-jet system complicates the manufacturing process, since it is difficult to maintain focus of the two laser beams in order to achieve consistent welding or cutting. Two laser systems also require special optics to prevent the laser beam of one laser coupling back into the other laser damaging it.

Next, another plastic bag forming device utilizes a vacuum hold-down table and a single laser that can be moved around the table to perform the cutting and welding operations. It uses a frame or rollers to stretch the sheets to be welded in intimate contact. A disadvantage with this invention is that the sheets tend to become distorted during the stretching, and may cause wrinkles in the finished product, and this method requires the use of heated rollers and platens. More importantly, the framing method and apparatus limits the size of the bag or assembly that can be manufactured, as very large sheets cannot be effectively tensioned so that the contact is maintained consistently across the entire sheet. In some new applications, especially bags for cell culture, there is a need to make large bags that can easily exceed 6 by 10 feet in size.

Another problem with laser cutting of clear films is the tendency of vaporized film particles to redeposit onto the film surface. This leads to an unsightly appearance not suitable for the manufacture of pharmaceutical products. A major limitation of other prior art devices is that they are restricted to two dimensional or planar assemblies. It is often desirable to weld thermoplastic sheets to form three dimensional structures. To do so requires a welding method and apparatus that has a small weld zone through which the sheets to be welded may be moved freely in any direction without any restriction imposed by fixturing frames.

Therefore, there is a need for a system that allows a user to maintain consistent welding and cutting to simply form a bag or assembly. Also, there is need for a system that allows a user to make a large bag that can easily exceed 6 by 10 feet in size.

SUMMARY OF THE INVENTION

The present invention has been accomplished in view of the above-mentioned technical background, and it is an object of the present invention to provide a system and method that provides a system that allows for the consistent welding or cutting of materials to form bags and other assemblies.

In a preferred embodiment of the invention, a method of forming plastic bags is disclosed. Making such a bag requires the cutting and joining together of two plastic sheets. This involves: 1) the cutting of the bag outline in the first sheet; 2) the placement of the second sheet on top of the first sheet and the welding together of the sheets along defined seams to form the bag; and 3) the cutting out of the bag outline to form the finished bag. The method includes: providing a support platen having a cut outline and a groove in the cut outline at a top surface of the support platen and a plurality of perforations in the groove through the support platen. The underside of the support platen is maintained at a lower pressure relative to the top surface so that any film vaporized during the cutting operation is exhausted through the perforations and thus not allowed to deposit onto the cut film. A gas jet is provided concentric to the laser to facilitate the transport of the vaporized materials. Other perforation as provided in the support platen. These are also connected to the low pressure on the underside and as essential to hold the sheets done on the platen so that they do not move during the operation.

The perforated groove in the platen follows the cut outline. For welding the laser beam is defocused so that it heats the plastic films but does not cut through. The concentric gas jet forces the two plastic films together in the weld zone so that the melted material fuses together. The gas jet also cools the weld zone rapidly reducing any distortion or wrinkling Since the films are not cut through during the welding operation, there is requirement to provide any groove or perforations in the support platen along the welding path.

The grooves and perforations needed in the support platen can be made by the same laser apparatus as used for the manufacture of bags. This makes is easy to rapidly produce new bag patterns. The apparatus can also be used to attach ports and other plastic fittings typically attached to the bag assembly.

BRIEF DESCRIPTION OF THE DRAWINGS

In the following the term laser is used to include all lenses, mirrors, and other components of the complete laser beam delivery system.

These and other advantages of the present invention will become more apparent as the following description is read in conjunction with the accompanying drawings, wherein.

DETAILED DESCRIPTION OF THE INVENTION

The presently preferred embodiments of the invention are described with reference to the drawings, where like components are identified with the same numerals. The descriptions of the preferred embodiments are exemplary and are not intended to limit the scope of the invention.

The present laser cutting apparatus provides the following advantages over previous inventions by: 1) utilizing only a single laser in a horizontal plane acting against a fixed surface; 2) not requiring a frame to hold the sheets in intimate contact; 3) not requiring any potentially contaminating absorbing materials; 4) being applicable in general to any thermoplastic material available in thin sheets; 5) being usable for very large sheets as there is no need for a tensioning frame; 6) eliminating the re-deposition of vaporized plastic; and 7) being usable to make three dimensional structures.

Figure 1:
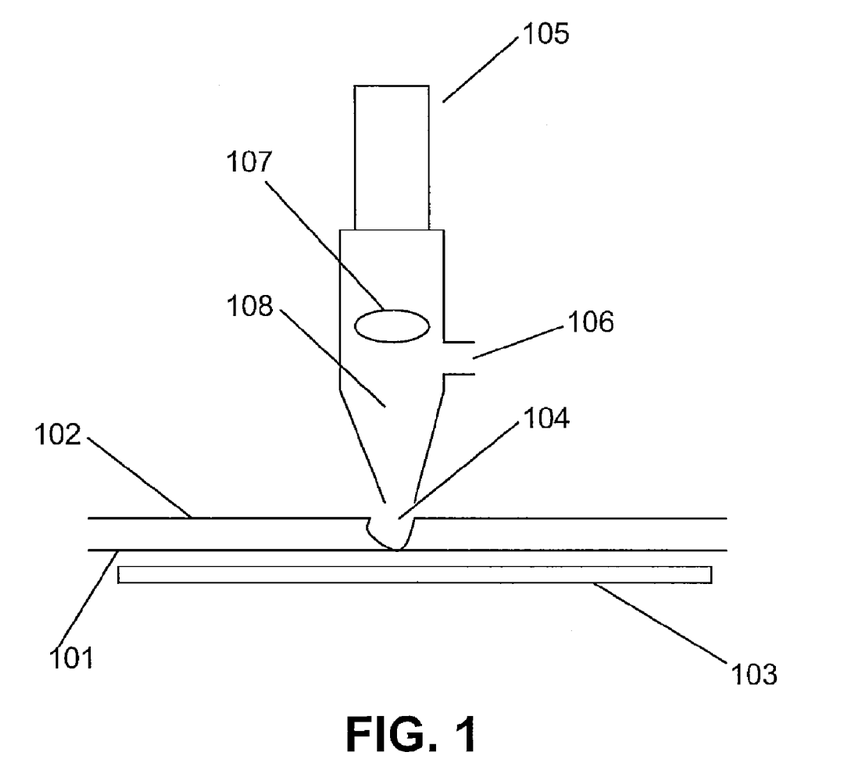
FIG. 1 illustrates a portion of a laser cutting system employed in accordance with an embodiment of the invention.

FIG. 1 illustrates a portion of the laser cutting system. Laser cutting system 100 includes: a first film 101, a second film 102, a typical support platen 103, a melt zone 104, a laser 105, an opening 106, a lens 107 (focus lens 107) and a nozzle 108. Laser 105 is able to move vertically to adjust its distance from films 101 and 102 that are to be cut by a tightly focused beam from laser 105. During the cutting operation, air or another suitable gas is introduced at high pressure by the opening 106 into the nozzle 108. The high velocity air or steam introduced at high pressure pushes any vaporized plastic through the cut plastic into the cut outline groove (located under the cut) and then through perforations into the exhaust plenum. This feature minimizes the deposition of vaporized plastic onto the cut film. Welding of seams is accomplished by a defocused beam from laser 105. Laser energy is transmitted from the laser 105 and focused by lens 707 onto the melt zone 104. Air or another suitable gas is introduced at high pressure by the opening 106 into the nozzle 108. The high velocity air or gas introduced at high pressure pushes the melted films 101 and 102 together on melt zone 104 and may also rapidly cool the weld area or melt zone 104. There are no perforations or grooves in the weld path so that the high pressure air of gas is effective in generating a high local pressure. A key advantage of this invention is that it provides for a very small (<0.5 inch) melt zone. The small melt zone proves an advantage in that it eliminates the need for complex fixtures and allows the weld to follow curves and contours necessary for 3-dimensional structures. A suitable inert gas such as helium or nitrogen could be used in lieu of air to prevent charring of film 101 or 102. Support platen 103 may be referred to as support 103. Even though only film 101 and film 102 are utilized in this invention to make bags, containers or other assemblies, multiple layers of films may be utilized to make bags, containers or other assemblies.

First film 101 and second film 102 are thermoplastic films that melt before burning, such as polyethylene and Polyvinylidene Difluoride (PVDF). The size of the first film 101 and second film 102 can have any length 0.5 inches to 10 or more feet and a width in a range of 0.5 inches to 10 or more feet. In another embodiment of the invention, the first film 101 and second film 102 may have any shape, such as a rectangular, polygonal, tetrahedral, octagonal, square or any shape know to those of ordinary skill in the art. Films 101 and 102 may have a thickness in the range of 3-40 milli-inches (mils). Preferably, the films 101 and 102 will have a thickness of 12 mils.

Figure 4:
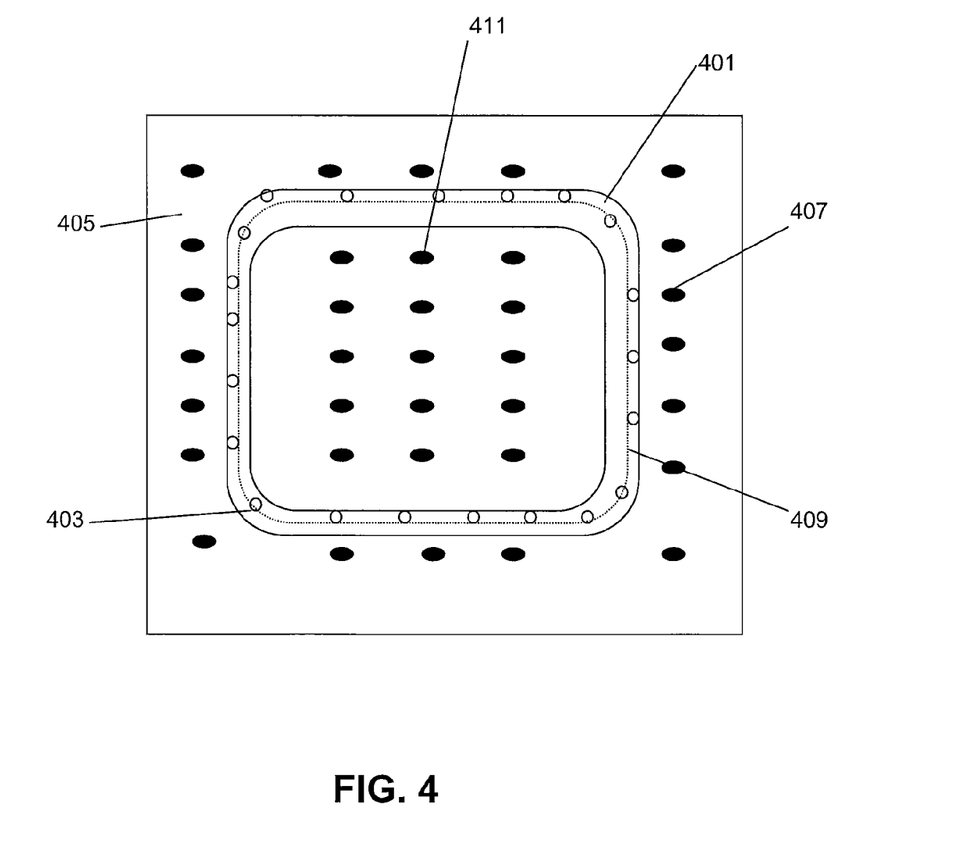
FIG. 4 shows a plan view of a hold-down platen of the laser cutting apparatus of FIG. 1 in accordance with the invention.

The film support platen 103 performs several functions:

1) Perforations in the platen 103 are used to apply a vacuum to secure the film so that it cannot move during the cutting or welding operations;

2) The platen 103 has grooves 401 that allow the vaporized plastic film 101 to be rapidly carried away. These vacuum grooves 401, along with the gas jet from a cutting tip from the laser 105 force all the vaporized materials into a vacuum system or vacuum collection device, thus preventing any re-deposition onto the finished film;

3) The platen 103 provides a rigid support for the film 102 during the welding operation when it is subjected to the controlled pressure air jet from the nozzle 108; and 4) The platen 103 prevents any air pockets between the two sheets of film 101 and 102. Platen 103 has the groove 401 (FIG. 4) under each cut outline 409 so that vaporized plastic fumes generated during the cutting operation are swept away. An upper plate 405 of the support platen is made of a thermoplastic material, such as high density polypropylene. This material can be cut and drilled by the same laser 105 used for cutting and welding of plastic films. In this manner, a custom platen can quickly be made for any bag geometry. No fixture is required. Depending on the relative size of the platen 103 and the bag to be manufactured, a plurality of bags could be made on a single platen.

The upper plate 405 or top surface 405 of the support platen 103 should be made of material with low thermal conductivity, such as high density polypropylene. Otherwise, it will act as a heat sink and draw energy away from the melting or welding zone 104. This could prevent the formation of a strong seam. The material used for the upper plate 405 may also be chosen to have non-stick properties such that it does not stick on the film during the cutting and welding operations. In a preferred embodiment, the upper plate 405 would be made of acrylic or polypropylene materials.

Figure 3:
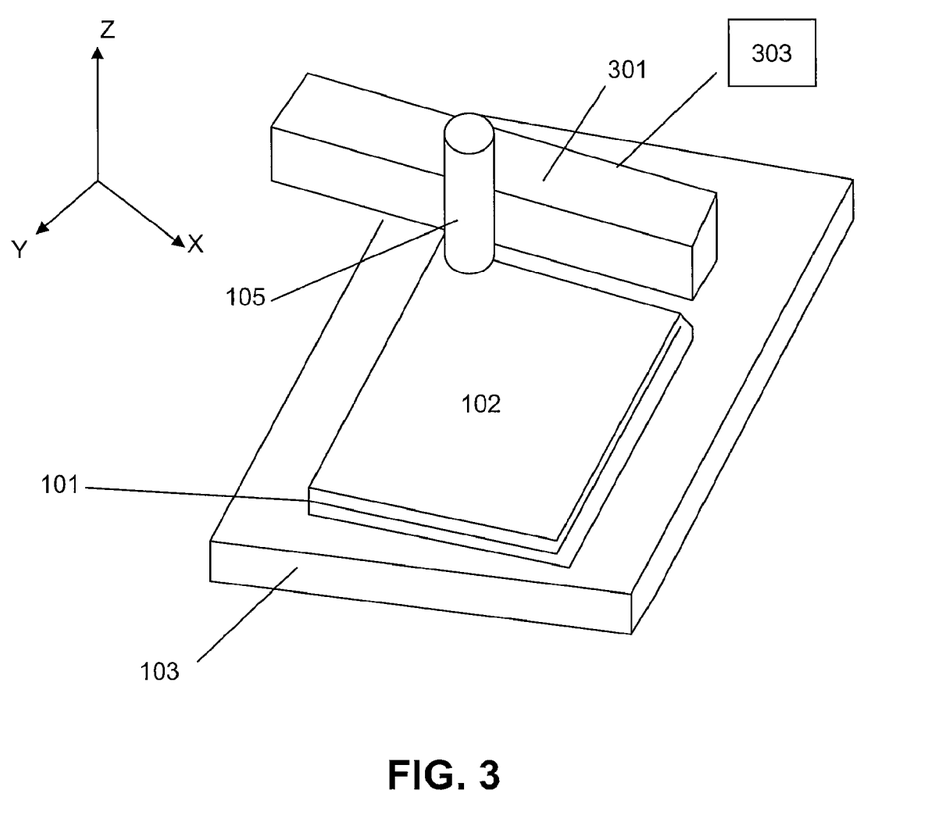
FIG. 3 shows a perspective of the laser cutting apparatus of FIG. 1 in accordance with the invention.

FIG. 3 shows the laser cutting apparatus. A gantry robot apparatus that can cut and weld films together to form bags includes the horizontal support platen 103 and the laser 105 mounted on a gantry 301 capable of movement in the X, Y, and Z directions. Gantry 301 may also be known as a positioner. Gantry 301 enables the laser 105 to be positioned at any location because the gantry 301 is able to move the laser 105 and the support platen 103 relative to each other. The speed and motion profile of the gantry 301 is controlled by a typical controller 303, which is connected to the gantry 301, where the controller 303 operates under the direction of a computer program. The controller 303 instructs the laser 105 to: turn ON and OFF to emit laser energy, to be moved at any desired speed and to follow any combination of straight and curved paths. The laser 105 can be switched ON or OFF to facilitate repositioning. Although, the gantry 301 is shown connected to the laser 105, it may alternatively be mounted to the support platen 103 to produce relative motion between the platen 103 and the laser 105. In another embodiment of the invention, the controller 303 is a typical computer that includes the computer program on its processor or memory that controls the operation of the gantry 301 and laser 105. In yet another embodiment of the invention, the controller 303 is a typical multi-axis motion controller, where this multi-axis motion controller executes the program and generates signals to the motor drives to move the various parts of the system in a coordinated matter. The controller 303 is also connected to a gas pressure container (not shown) that releases gas or air pressure through the nozzle 108 of laser 105. Controller 303 controls the gas pressure container, laser 105 and the gantry 301 to move the laser 105 and the support platen 103 relative to each other to weld the first film 101 and the second film 102 at the groove 401 (FIG. 4).

The laser 105 can also be moved in the vertical (Z) axis to change the focus point in order to change from a focused cutting to a defocused welding operation, or to maintain focus on different thickness films. The speed, laser intensity, and focal length necessary, may be calculated, or determined experimentally based on the film material and its thickness. The speed, laser intensity, and required focal length are determined by the characteristics of the film, such as melting temperature of the films to be welded, film thickness, and required width of weld.

Figure 2:
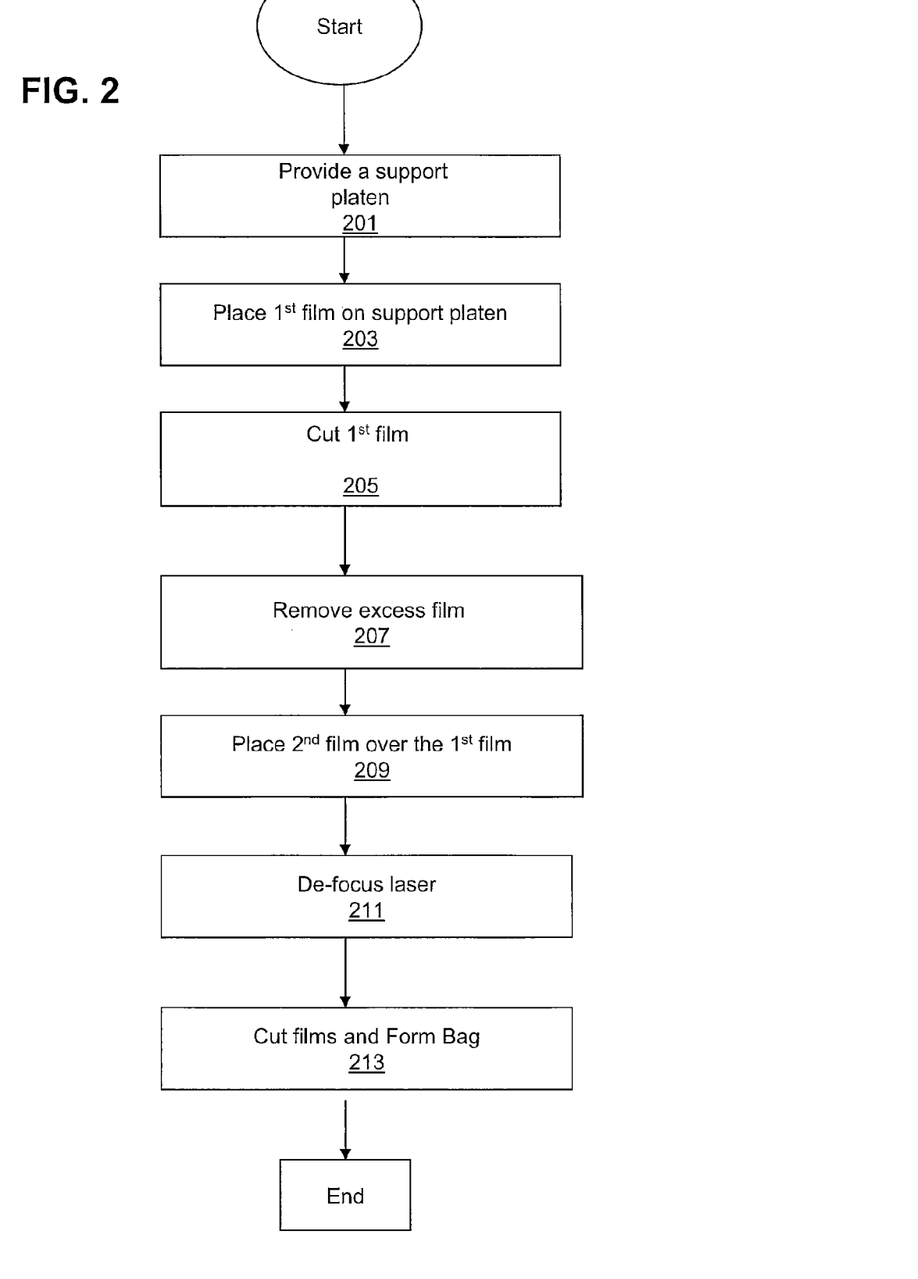
FIG. 2 is a flow-chart that depicts how the laser cutting apparatus of FIG. 1 is utilized in accordance with an embodiment of the invention.
Figure 5:
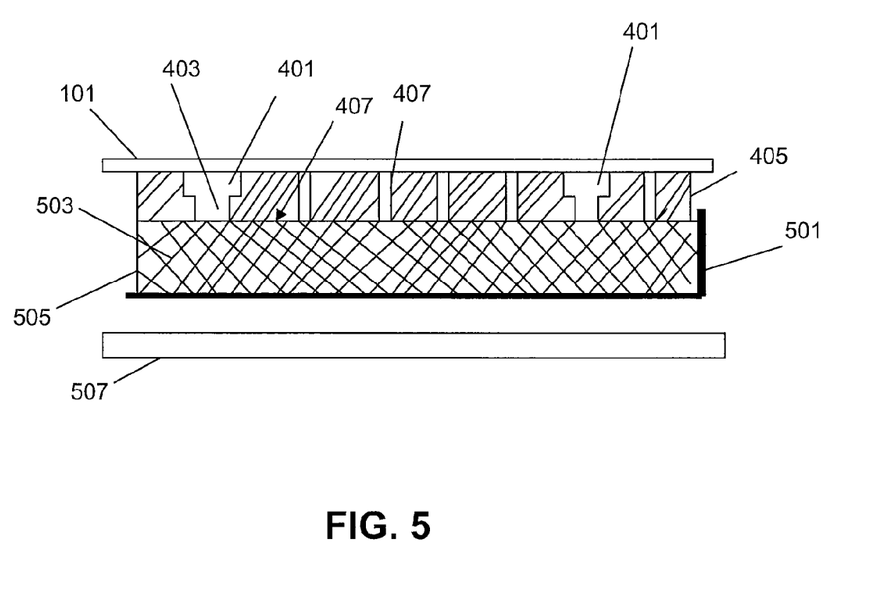
FIG. 5 shows a cross-sectional view of the hold-down platen of FIG. 2 in accordance with the invention.

FIG. 2 depicts a flow chart of how the laser cutting apparatus is utilized. At block 201, a support platen 103 (FIG. 1) is made for a specific bag or assembly. A groove 401 (FIG. 4) is made on an upper plate 405 of the support platen 103 by making and then following, in a typical manner such as using a drill, an outline or cut outline 409 for a film, such as film 101. Holes or exhaust ports 403 are made at set intervals in the groove 401 to direct vapors to the underside of the upper plate 405. Additional holes or perforations 407 are in an outer portion of the upper plate 405 to hold the film 101 down securely during the cutting and welding operations. Also, additional holes or perforations 411 are in an inner portion of upper plate 405, where the holes 411 are spaced closely together in a distance range of about 0.3-1.0 to secure the cut film 101 to the upper platen 405. Preferably, the perforations 411 are spaced 0.5 inches from each other. Grooves 401 extend partially into the upper plate 405 as shown in FIG. 5. This upper plate 405 is supported by a honeycomb or porous intermediate plate 503. The intermediate plate 503 rests in box 501 that has a vacuum opening 505 connected to one or more vacuum sources that continuously sucks condensed particles from inner holes 411 and outer holes 407 to a collection device.

Next, at block 203 the first film 101 is placed on the support platen 103. A user may physically take a sheet of film 101 from a roll of film or de-spool the film and put it on top of the support platen 103. In another embodiment of the invention, after the film 101 is placed on top of the support platen 103, then the user may flatten out the film 101 with a typical crease removing device. At this time, the one or more vacuum source sucks air from inner holes 411 and outer holes 407 on the upper plate 405 to secure the film 101 on the support platen 103.

Referring to FIG. 2, at block 205, the film 101 is cut by laser 105. Laser 105 utilizes a laser beam that is directed onto the film 101 by the controller 303 (FIG. 3) to focus the lens 107 on the cut outline 409 just above groove 401 to cut the film 101. Lens 107 is set to focus to a sharp point and is moved at a set speed sufficient to cut through the film 101, where the lens 107 is utilized to cut the film 101 around the cut outline 409. For cutting, the laser 105 is focused to a setting suitable for cutting. The laser spot size for cutting is less than that for welding. Typical spot sizes for cutting are preferably less than 0.010 inch outside diameter.

Figure 6:
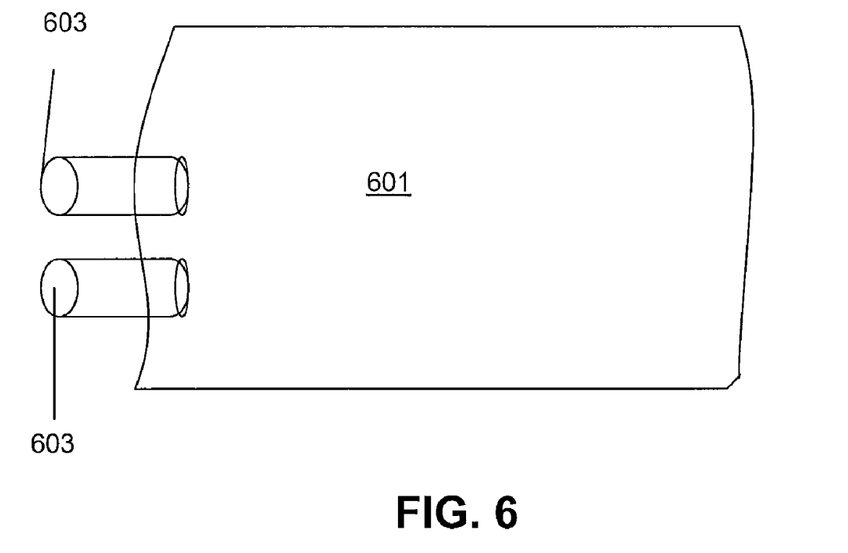
FIG. 6 shows a bag made by utilizing the laser cutting apparatus of FIG. 1 with ports on an upper surface of the bag in accordance with the invention.

As the film 101 is being cut, an outside portion of the film on the cut outline 409 becomes vaporized plastic and it is drawn downwards through the groove 401 and holes 403 into the intermediate plate 503. The one or more vacuum sources on the bottom of holes 403 sucks these vapors and condensed particles of the film 101 to the collection device through vacuum opening 505. After the cutting process, the laser 105 is then de-focused by the controller 303 to a welding setting, such as a spot of outside diameter of about 0.1 to 0.3 inches, by moving the laser 105 up and down along the Z axis and the ports 603 are welded to the film 101. Optionally, the user can utilize the controller 303 to weld ports fixtures or other fixtures onto the film 101 when making a bag. The ports fixtures or other fixtures are often required to provide sample ports, and to connect tubes to the bag. Referring to FIG. 6, a typical cell culture bag 601 is shown with a plurality of face ports 603. These ports 603 can be easily attached to the bag as shown in FIGS. 7A-7D.

Figure 7A:
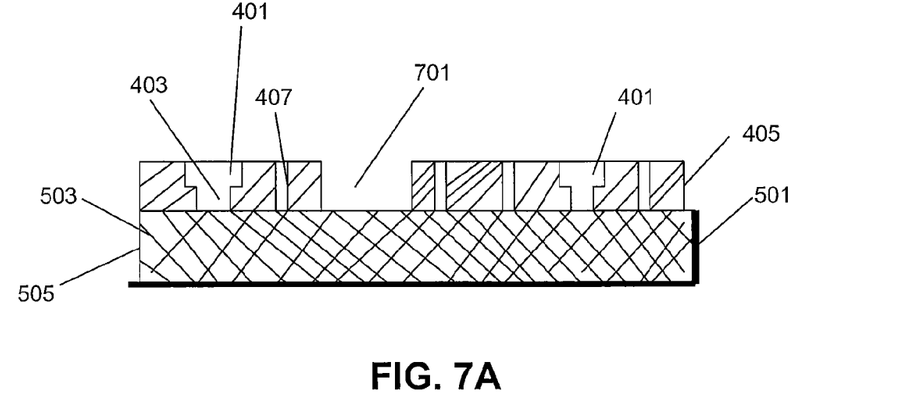
FIG. 7A-7D illustrate a port fixture to the film in accordance with the invention.
Figure 7B:
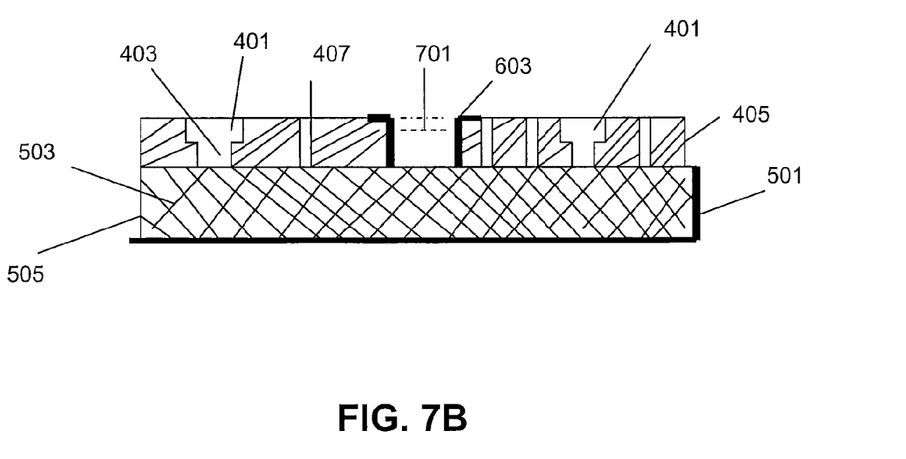
Figure 7C:
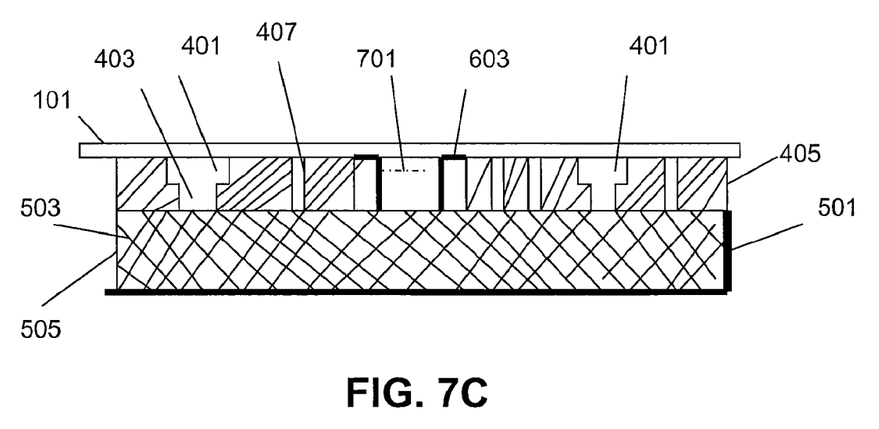

FIG. 7A shows a recess 701 in the platen upper plate 405. FIG. 7B shows how the port fixture 603 or port fitting is first placed into plate opening 701 in the platen upper plate 405. The port fixture 603 is supported on the intermediate plate 503. The first thermoplastic film 101 is placed on top of the port fixture 603 (FIG. 7C).

Figure 7D:
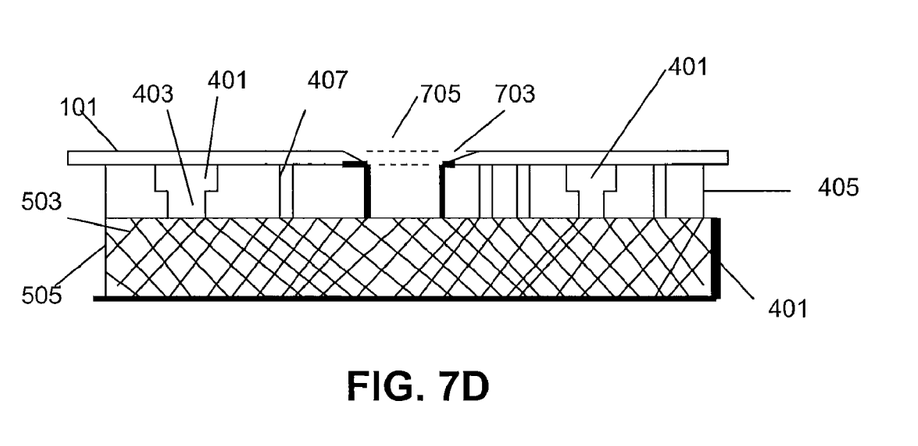

Referring to FIG. 2, optionally the laser beam lens 107 focus is switched by the controller 303 to a setting suitable for welding, and one or more welds are made at the weld zones 104 around each port fixture 603 to attach it firmly to the film 101. As shown, the laser 105 is controlled to produce a bevel 703 descending to the opening of the port fixture 603. Next, a film opening 705 is cut by the laser 105 in the film 101 (FIG. 7D). This optional welding of ports fixtures 603 to the film 101 may occur before or after the film 101 is cut by the laser 105.

At block 207, the excess film from film 101 is removed. This excess film is along the outer holes 407 outside of the cut outline 409 or along the edges of film 101 is removed by the user manually. Next, at block 209 the second film 102 is laid on top or placed directly on top of the first film 101. A user may physically take a sheet of the film 102 from a roll of film or de-spool the film and put it on top of the cut film 101. In another embodiment of the invention, when the film 102 is on top of the cut film 101 the user may flatten out the film 102 with a typical crease removing device.

At block 211, the user utilizes the controller 303 and the robot gantry 301 to instruct the laser 105 and lens 107 to now be defocused so that a wider spot than that used in cutting, in a range of about ⅙ to ⅜ inches in diameter, is created to weld, forming a seam. High-velocity air is directed of out of a nozzle 108 concentric with the beam from the laser 105. The laser 105 is then moved by the gantry 301 along the path of the desired weld along the groove 401, such as the melt zone 104 (FIG. 1). This pushes the molten materials of films 101 and 102 together to form a strong weld and also rapidly cools the weld zone to prevent burning and distortion. Laser 105 and the support platen 103 moves relative to each other to weld the first film 101 and the second film 102 that forms a seam outline made by the seam. The speed the laser 105 is moving at is predetermined to produce the required seam width and penetration. In one embodiment of the invention the laser 105 moves at approximately 1-5 centimeters/second. The laser energy of laser 105 may be anywhere in the range of 10-300 W, preferably the laser energy of the laser 105 is at least 25 W. The speed that the laser 105 is at a rate controlled to produce the desired seam. This has the advantage that curved seams can be made and that there is no restriction on the shape of the seams. In another embodiment of the invention, if a laminated film for film 101 or film 102 is used, then like materials are preferably positioned over each other so as to be thermally weldable. The pressure of the air being delivered to the air nozzle 108 can be adjusted to optimize the process. The typical range is 5-20 pounds square inch (psi) through the nozzle 108 with a diameter of about 0.325 inch. The air jet pushes the film 102 into the film 101 against the support platen 103.

This intimate contact results in the two melted layers fusing together and forming a weld. The air also rapidly cools the melt zone 104 (FIG. 1), preventing the melted material from flowing out of the desired seam width. The films to be welded are held in intimate contact just around the melt zone 104 of the laser by the combination of the vacuum table 507 to remove any gas that might be present between the two films and a jet of gas or air at controlled pressure from nozzle 109 that is directed at the melt area to pus the melted layers together. The fast cooling instantly provides a strong weld without any creasing or wrinkling common with heat-sealing procedures. Laser 105 utilizes a point source laser beam that is moved by controller 302 (FIG. 3) that seam welds films 101 and 102 to form a bag, which requires careful optimization of laser intensity and speed of laser movement of laser 105. The seams as made are very strong and will not delaminate. The edges are cut to a precision that does not require any trimming or post-production operation. Tubing and other assemblies are then fixed to the bag and it is packaged for sterilization using gamma radiation. The automated assembly process minimizes human contact with the inside surfaces of the bag. All operations can be performed in a clean room. The platen 103 design sweeps away any particulate contaminants generated during the cutting and welding operations.

Once the seaming operation is completed at block 211, the laser 105 is focused back by the robot gantry 301 to cut mode at block 213 and the path can be retraced to cut the finished bag, such as a trimmed bag along the cut outline 409. Since the laser 105 mount can be moved in both the X and Y axes, it is possible to make any straight, curved or irregular shape and then this process ends. The seams can be any shape, including complex curves. This operation allows for efficient production of multiple bags in one pass and also eliminates any need for hand trimming of the final product.

A major advantage of the present method is that no contact between the two films 101 and 102 is required except at the weld point. Since the films are cut to size in place, the films can be placed on the platen in any orientation. They can be freely repositioned. No precision fixture manipulation is needed, thereby saving time and complexity. In the same manner, the second film layer is just laid on top without any need for precision positioning. It too can be repositioned to remove wrinkles This method is easily adaptable to dissimilar materials as long as their thermal properties are compatible. Since the entire bag-making operation can be done without moving any of the sheets, there is no need for complex alignment devices. Since the film is not handled until the bag is finished, the process is well suited to automated operation. Reducing the handling of the film minimizes creases, cracks, contamination, and other damage.

Figure 8:
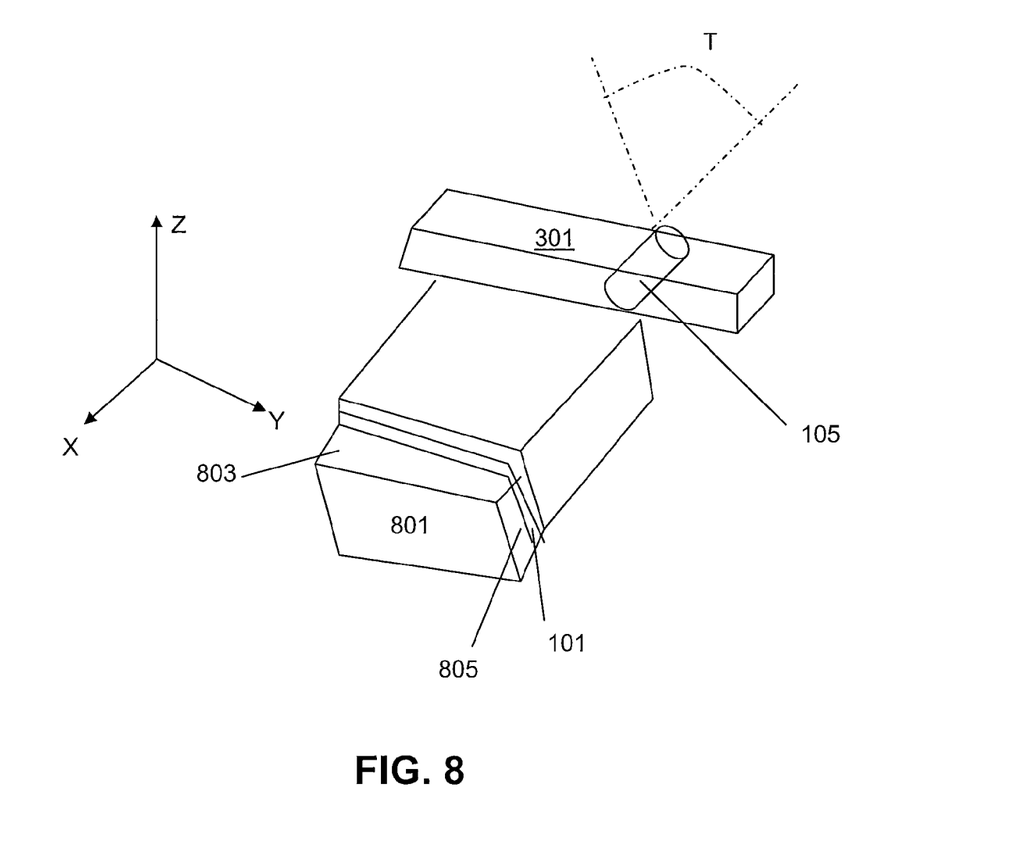
FIG. 8 illustrates welded three dimensional structure in accordance with the invention.

The ability to produce a three dimensional container is shown in FIG. 8. The angle "T" of laser 105 can also be adjusted. The hold-down platen 801 is a 3-dimensional structure having the groove 401 with exhaust ports 403 and the perforations 407 (FIG. 4) on two adjacent surfaces 803 and 805. This enables the construction of complex 3-D structures such as bags with polygonal or circular cross-sections or containers.

The present methods and apparatus relate mainly to the manufacture of plastic bags for pharmaceutical and cell culture applications. Such bags are typically manufactured of two films that are seamed together to form a bag. Ports for sampling, filling, etc., may be provided on the upper, lower, or side walls of the bag. The method first involves the preparation of the platen 103 where the cut outlines of the bag are etched. In a preferred embodiment of the invention, this is done by the same laser 105 that is later used for the film cutting and welding operations. Using the same laser 105 reduces the number of operations and also eliminates the need to align the platen 103. The platen 103 is also perforated to function as a securing or "hold down" device. Rolls of film are positioned such that the film can be de-spooled and laid flat on the platen 103.

One or more ports fixtures 603 (FIG. 6) intended to be placed on the top surface are placed upside down (see FIG. 7A) into plate recess 701 in the platen upper plate 405. The film 101 intended to be the top surface is first laid on the platen upper plate 405 and vacuum table 507 applied via vacuum opening 505 to hold it down flat and without wrinkling By utilizing this vacuum table 507, the films 101 and 102 are held flat without any bunching.

Referring to FIG. 5, the intermediate plate 503 rests in a box 501 that has a vacuum opening 505 where an optional vacuum table 507 or a vacuum plate is attached to the vacuum opening 505 to suck out all the air in between films 101 and 102. The vacuum table 507 is utilized to hold the films 101 and 102 in position and to remove vapors or gas from the nozzle 108 and condensed particles before they can contaminate the a cut line or the melt zone 104 of the films 101 and 102. It takes a minimum of 10 inches of $H_2O$ to hold films 101 and 102 in place, so the vacuum table 507 blowers must be sized to move enough air to maintain this level of vacuum dependent on the size of the table and the amount of open area. The plate 503 and the box 501 form a manifold for the platen 103 (FIG. 1).

The film 101 to be cut or welded rests on the top plate 405. For cutting, the laser beam is directed onto the film 101 just above groove 401. As the film 101 is cut, the vaporized plastic is drawn downwards through the groove 401 and hole 403 into the intermediate plate 503 (FIG. 5). The vacuum table 507 source sucks these vapors and condensed particles to a collection device thorough vacuum opening 505. These holes 407 can be located wherever the film 101 needs to be held down as shown in FIG. 4. Not requiring a uniformly distributed hole layout significantly reduces the vacuum required to hold down the film 101.

This invention provides an apparatus for laser cutting and welding materials to allow the user to form bags and assemblies from the materials. The user is able to utilize the apparatus to simply maintain consistent welding and cutting of materials to form a bag or an assembly. This apparatus enables the user to direct air concentric with a laser beam in order to form a tight bond between two or more materials and cool the weld zone between the materials to prevent burning and distortion in forming a bag, which can exceed 6 by 10 feet in size. Thus, this invention provides the user with a simple method to cut and weld two or more films to form a bag, assembly, or any three dimensional structure.

Although the present invention has been described above in terms of specific embodiments, many modification and variations of this invention can be made as will be obvious to those skilled in the art, without departing from its spirit and scope as set forth in the following claims.

What is claimed is:

1. A method of forming plastic containers comprising:
providing a support platen having a cut outline and a groove in cut outline at a top surface of the support platen and a plurality of exhaust ports connected to the groove, wherein a plurality of spaced perforations are in the top surface of the support platen, wherein the groove is configured to define a cut outline;
positioning a first film on the top surface of the support platen;
providing a laser to cut the first film along the cut outline of the top surface of the support platen;
providing a second film on top of the first film;
connecting the plurality of exhaust ports and the plurality of space perforations to a vacuum source to secure the first film to the support platen;
directing a jet of gas onto the second film at the groove to maintain the second film in contact with the first film at a seam during welding concentric with a beam from the laser to weld the first film and the second film;
moving the laser and the support platen relative to each other to weld the first film and the second film along a seam outline; and
providing the laser to cut the first film and the second film along the cut outline to provide a trimmed bag.

2. The method of claim 1, wherein the support platen includes a recess and further comprises placing a port fitting in the recess and positioning the first film on the support platen over the port fitting, and moving the laser and the support platen relative to each other to weld the fitting to the first film.

3. The method of claim 2, including controlling the laser to weld the port fitting to the first film and controlling the laser to cut the first film to form an opening surrounded by the port fitting weld.

4. The method of claim 3, including controlling the laser to form the fixture weld as a bevel descending to the opening.

5. The method of claim 1, including moving the laser and the support platen relative to each other to cut the first film and the second film to form the cut outline of a container.

6. The method of claim 5, wherein the distance between the laser and the support platen is changed to switch between a focused cutting to a de-focused welding.

7. The method of claim 1, further comprising moving the laser and the support platen relative to each other in three dimensions to weld the first film and the second film at the groove.

8. A method of making bags, comprising:
providing an outline on a support platen, wherein the outline includes a groove and a plurality of exhaust ports;
providing a first plurality of holes in an inner portion of the support platen;
placing a first film on the support platen, wherein the first plurality of holes are configured to secure the first film onto the support platen;
providing a laser to cut the first film along the outline on the support platen, wherein an outer portion of the first film is configured to be vaporized by the laser and drawn towards the groove and the plurality of exhaust ports;
removing an excess of the first film;
placing a second film on top of the first film;
defocusing the laser on the groove concentric with directing a high-velocity air through the laser on a seam;
moving the laser along a path of a desired weld along a seam outline, wherein the laser is configured to form a weld between the first film and the second film in a weld zone on the groove and the high-velocity air is configured to cool the weld zone; and
directing the laser to cut along the outline to form a bag.

9. The method of claim 8, further comprising providing a porous intermediate plate configured to support the support platen.

10. The method of claim 9, wherein the intermediate plate rests in a box that has a vacuum opening that continuously sucks condensed particles from the first plurality of holes and the second plurality of holes.

11. The method of claim 10, wherein the vacuum opening is connected to at least one vacuum source.

12. The method of claim 8, further comprising providing a second plurality of holes in an outer portion of the support platen.

13. The method of claim 12, wherein the second plurality of holes are configured to hold down the first film to the support platen.

14. The method of claim 8, wherein the first plurality of holes are spaced closely together.

15. The method of claim 14, wherein the first plurality of holes are spaced closely together in a distance range of about 0.3-1.0 inches.

16. The method of claim 8, wherein defocusing the laser includes a controller configured to instruct the laser to defocus to a wider spot.

17. The method of claim 16, wherein the wider spot has a diameter in a range of about 1/6 inch to 3/8 inch.

18. The method of claim 8, further comprising wherein the plurality of exhaust ports are located at set intervals in the groove.

19. The method of claim 8, further comprising providing a controller configured to direct the laser to cut the first film along the outline on the support platen.

20. The method of claim 8, wherein the high-velocity air being directed out of the laser is being directed at a pressure in a range of 5-20 psi.

21. The method of claim 8, further comprising sterilizing the bag using gamma radiation.

22. A system for forming a container, comprising:
a support platen, wherein the support platen includes a cut outline that has a groove and a plurality of exhaust ports, wherein the support platen has an inner portion having a first plurality of holes;
a first film is provided on the support platen, wherein the first plurality of holes are configured to secure the first film to the support platen;
a controller connected to a gantry, wherein the gantry includes a laser, wherein the gantry is disposed over the first film and the support platen;
the laser is configured to cut the first film along the cut outline on the support platen;
a second film is placed on top of the first film in between the gantry and the first film;
the controller is configured to defocus the laser on a seam concentric with a high-velocity gas that is directed through the laser onto a seam outline; and
wherein the controller is configured to move the laser along the seam outline, wherein the laser is configured to form a weld at the seam outline in a weld zone and the high-velocity gas is configured to cool the weld zone.

23. The system of claim 22, wherein the support platen is supported by an intermediate plate.

24. The system of claim 23, wherein the intermediate plate is configured to rest in a box that has a vacuum opening, wherein the vacuum opening is connected to at least one vacuum source.

25. The system of claim 22, wherein the controller is configured to defocus the laser to a spot diameter in a range of about 0.1 to 0.3 inches.

26. The system of claim 25, wherein the controller is configured to move the laser focus lens in an up and down along a Z axis.

27. The system of claim 22, wherein the first film and the second film are thermoplastic films.

28. The system of claim 27, wherein the thermoplastic films is selected from the group consisting of polyethylene and polyvinyldene difluoride.

29. The system of claim 22, wherein the first film and second film have a thickness in a range of 3-40 mils.

30. The system of claim 29, wherein the first film and the second film have a thickness of about 12 mils.

31. The system of claim 22, wherein the laser is configured to move at a speed of a controlled rate when the laser is forming the weld in order to produce a continuous seam.

32. The system of claim 22, wherein the high-velocity gas is configured to push the second film into the second film against the support platen.

33. The system of claim 22, wherein the high-velocity gas is helium.

34. The system of claim 22, wherein the high-velocity gas is nitrogen.

35. The system of claim 22, wherein the first film and the second film has any shape selected from the group consisting of a rectangle, polygonal, tetrahedral, octagonal, square or other shape.

* * * * *